(12) United States Patent
Tolver

(10) Patent No.: US 6,328,157 B1
(45) Date of Patent: Dec. 11, 2001

(54) EYE-NOVELTY ITEM

(76) Inventor: Joe M. Tolver, 807 County Road, 153, Selma, AL (US) 36703

( * ) Notice: Subject to any disclaimer, the term of this patent is extended or adjusted under 35 U.S.C. 154(b) by 0 days.

(21) Appl. No.: 09/661,160

(22) Filed: Sep. 13, 2000

Related U.S. Application Data

(60) Provisional application No. 60/053,682, filed on Sep. 14, 1999.

(51) Int. Cl.[7] .............................. A23G 3/00; B65D 81/36
(52) U.S. Cl. ......................... 206/216; D9/318; 206/457; 426/104; 428/13; 446/73
(58) Field of Search ........................... D9/307, 310, 318, D9/337, 338, 418, 419, 549, 564; 206/216, 457; 426/104; 428/7, 11, 13; 446/71, 73

(56) References Cited

U.S. PATENT DOCUMENTS

| D. 315,676 | 3/1991 | Snipes et al. . | |
|---|---|---|---|
| D. 336,037 | 6/1993 | Lippens . | |
| D. 386,403 | 11/1997 | McGregor . | |
| D. 398,231 | 9/1998 | Gager et al. . | |
| 2,274,196 | 2/1942 | Gilbert . | |
| 2,590,279 | * 3/1952 | Soss ....................................... | 428/13 |
| 2,807,901 | * 10/1957 | Gilowitz ................. | 428/13 |
| 2,823,490 | 2/1958 | Griem . | |
| 3,099,568 | * 7/1963 | Brody et al. ........................... | 446/73 |
| 3,138,249 | 6/1964 | Pauline . | |
| 3,507,416 | 4/1970 | Douglas et al. . | |
| 5,632,377 | * 5/1997 | Ferrero ................................. | 206/457 |
| 5,874,119 | 2/1999 | Coleman et al. . | |
| 5,906,846 | * 5/1999 | Coleman et al. ..................... | 426/104 |
| 6,093,428 | * 7/2000 | Hoeting et al. ....................... | 426/104 |
| 6,099,873 | * 8/2000 | Coleman et al. ..................... | 426/104 |

FOREIGN PATENT DOCUMENTS

WO 94/04441    3/1994   (WO) .

* cited by examiner

*Primary Examiner*—Jim Foster
(74) *Attorney, Agent, or Firm*—Richard C. Litman

(57) ABSTRACT

The candy dispensing novelty item is a transparent, tubular container having an eyeball-shaped dispensing cap at a first end, a furry head piece and a cotton pompom necklace at a second end, and a shoulder strap and whistle. The shoulder strap passes through holes in the container and through the dispensing cap sleeve so as to secure the cap in a manner analogous to a tether or a leash. That is, each end of the shoulder strap terminates with a bead that is larger than the holes in the container and cap sleeve through which the strap passes. The dispensing cap has a ring-shaped exterior lip to halt the insertion of the cap sleeve into the first end of the container. Numerals representing the sports jersey of a favorite player may also be provided on top of the furry head piece. As a safety feature, the eyeball-shaped figure on the dispensing cap is reflective and serves to warn vehicles in a parking lot of oncoming pedestrian sports fans. The furry head piece may come in a variety of colors so as to match the colors of virtually any sports team.

5 Claims, 3 Drawing Sheets

EYE-NOVELTY ITEM

CROSS-REFERENCE TO RELATED APPLICATION

This application claims the benefit of U.S. Provisional Patent Application Ser. No. 60/153,682, filed Sep. 14, 1999.

BACKGROUND OF THE INVENTION

1. Field of the Invention

The present invention relates to a novelty candy holding device.

2. Description of Related Art

Different types of candy dispensers have been designed for children, for the purpose of dispensing wrapped candy. None have been created thus far that have a multitude of functions and uses appealing to children and adults alike. Some examples of prior candy dispensers include:

U.S. Pat. No. 5,874,119, issued to Coleman, et al. on Feb. 23, 1999, describes a novelty candy holder and dispenser comprised of a tube to hold candy, the tube being capped at one end by an object shaped like a brain. Coleman, et al. does not teach the present invention as claimed.

U.S. Pat. No. 2,823,490, issued to P. D. Griem on Feb. 18, 1958, describes a transparent, cylindrical tube for storing articles, wherein the tube is capped at either end with a figure, such as the head and tail, respectively, of an animal. Griem does not teach the present invention as claimed.

U.S. Pat. No. 3,138,249, issued to H. H. J. Paulini on Jun. 23, 1964, describes a transparent, candy-holding cylinder capped at one end by a furry ball and a flag. Paulini does not teach the present invention as claimed.

U.S. Pat. No. Des. 315,676, issued to Snipes, et al. on Mar. 26, 1991, illustrates a combined container closure and balloon. Snipes, et al. does not teach the present invention as claimed.

U.S. Pat. No. Des. 386,403, issued to Novia McGregor on Nov. 18, 1997, illustrates an applicator device comprising a hollow cylinder and a foam ball. McGregor does not teach the present invention as claimed.

U.S. Pat. No. 2,274,196, issued to A. C. Gilbert on Feb. 24, 1942, describes a transparent container having a cap and ball. Gilbert does not teach the present invention as claimed.

U.S. Pat. No. 3,507,416, issued to L. C. Douglas, et al. on Apr. 21, 1970, describes a package comprising an ornamental casing over a cylindrical container. Douglas, et al. does not teach the present invention as claimed.

PCT Publication No. WO 94/04441, published on Mar. 3, 1994, describes a transparent oval container having opposite caps in the shape of an animal or human head and rear end. Publication No. WO 94/04441 does not teach the present invention as claimed.

None of the above inventions and patents, taken either singly or in combination, is seen to describe the instant invention as claimed.

SUMMARY OF THE INVENTION

The present invention is a candy dispensing novelty item comprising an elongated, hollow, transparent, tubular container having a dispensing cap at a first end, and a head piece and pompom necklace at a second end, and a shoulder cord, or strap, and whistle therebetween. A sleeve located at a proximal end of the dispensing cap slides into the first end of the container. Holes in the container near the first end align with penetrations through the cap sleeve enabling the shoulder strap, or shoulder cord, to pass through the container and through the dispensing cap so as to hold the cap in a semi-permanent position analogous to a tether or a leash. The dispensing cap also has a dome-shaped distal end sporting an eyeball. The cap further has a ring-shaped exterior lip to halt the insertion of the cap sleeve into the first end of the container. Each end of the cord has fastened thereto a bead that is larger than the holes and the penetrations. Numerals representing the sports jersey of a favorite player may also be provided on top of a furry web. Finally, the dispensing cap has a reflective, or fluorescent, eyeball-appearing figure disposed on the exterior surface of its distal end to warn vehicles in a parking lot of oncoming pedestrian sports fans.

Attached to the second end of the container is a solid spherical styrofoam head piece, encapsulated by a furry web. The web may come in a variety of colors so as to match the colors of virtually any sports team. Abutting the head piece is a pompom necklace made from soft cotton balls.

Accordingly, it is a principal object of the invention to provide a novelty item for sports events, parties, etc., that dispenses candy through a removable cap containing a reflective eyeball.

It is another object of the invention to provide a novelty item for sports events, parties, etc., that dispenses candy and has an attached whistle.

It is a further object of the invention to provide a novelty item for sports events, parties, etc., that dispenses candy and has a shoulder strap that has means to leash item parts.

Still another object of the invention is to provide a novelty item for sports stadiums, parties, etc., that dispenses candy and has a soft, round fur ball that may be colored or numbered to represent certain sports teams, or colored to represent and to celebrate holidays such as Christmas or Valentines day.

Another object of the invention is to provide a candy-dispensing novelty item for sports stadiums, parties, etc., that dispenses candy and has a soft, round fur ball at one end, wherein the fur ball is bordered by an attractive pompom necklace.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
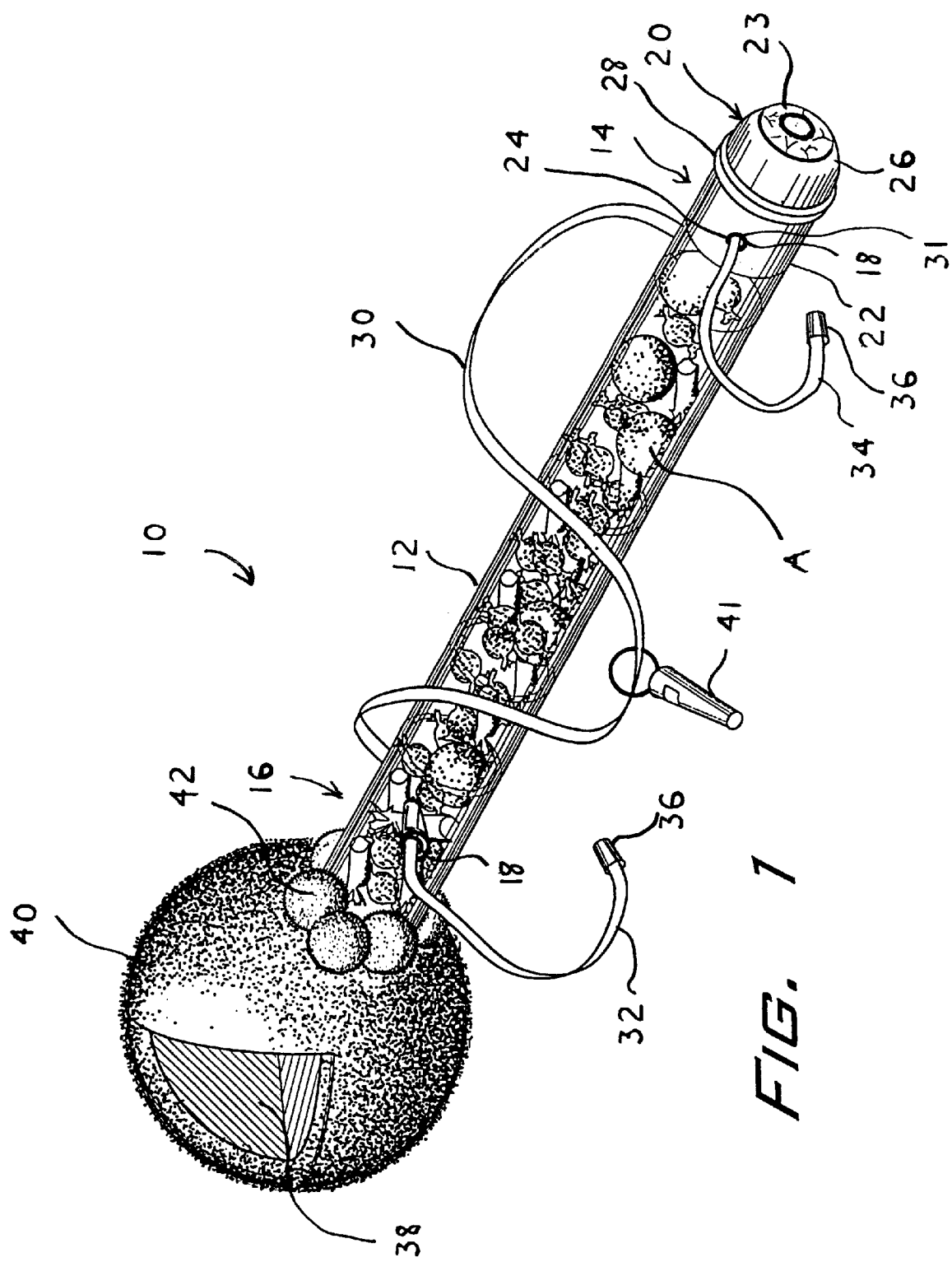
FIG. 1 is an environmental, perspective view of an eye novelty item, with a head piece broken away, according to the present invention.

As shown in FIG. 1, the present invention is a candy dispensing novelty device 10, comprising an elongated hollow transparent tubular container 12 having a first end 14, a second end 16, and a plurality of transverse holes 18 formed therethrough proximate each end of container 12. Container 12 is preferably eighteen and a half inches in length and one and three-quarter inches in diameter, and is made from plastic.

First end 14 of container 12 terminates in a dispensing cap 20 having an exterior surface and an interior surface, a cylindrical-shaped proximal end 22 having at least two openings 24 defined therein, a dome-shaped distal end 26, and a ring-shaped exterior lip 28 dividing proximal end 22 from said distal end 26. Proximal end 22 is slidably insertable into first end 14 such that lip 28 abuts container 12, and prevents cap 20 from entering further into container 12. Cap 20 has an eyeball FIG. 23 disposed on the exterior surface of its distal end 26. Eyeball FIG. 23 is preferably made from reflective glowing and/or fluorescent material. The proximal end 22 of cap 20 preferably extends approximately two inches into container 12.

The holes 18 in container 12 proximate first end 14 align with penetrations 24 for the purpose of enabling a shoulder strap, or shoulder cord 30, to pass through container 12 and through dispensing cap 20. An eyelet 31, preferably ⅛ inches in diameter and made from plastic or metal, is inserted onto the rim of each of holes 18, to minimize friction between the cord 30 and the hole 18. Shoulder cord 30 has two ends. One end 32 of cord 30 extends through two opposing holes 18 proximate second end 16, and another end 34 of cord 30 extends through two holes 18 and through two openings 24 that are proximate first end 14. Each end of cord 30 has fastened thereto a bead 36 that is larger than holes 18 and openings 24. Bead 36 prevents cord 30 from being pulled all of the way through container 12.

Thus, cord 30 has two functions. First, it can be used as a handle or shoulder strap to carry device 10. Second, because it penetrates and thereby captures end 22 of cap 20, cord 30 acts as a leash or tether for dispensing cap 20, preventing it from becoming separated from container 12.

Attached to second end 16 of container 12 is a solid, spherical, preferably styrofoam, head piece 38. Preferably, head piece 38 has a diameter of six inches and preferably, end 16 extends two and one-half inches into head piece 38. Attached, preferably glued, to the exterior of head piece 38 is a furry web or sheet 40, that encapsulates head piece 38. Sheet 40 is preferably made from synthetic fur on a substrate and may come in a variety of colors so as to match the colors of virtually any sports team.

Abutting head piece 38 is a pompom necklace 42 that encircles container 12. Preferably, necklace 42 is made from soft cotton balls, each having a diameter of approximately two and one-half centimeters. A plastic whistle 41 is threaded onto shoulder cord 30.

Figure 2:
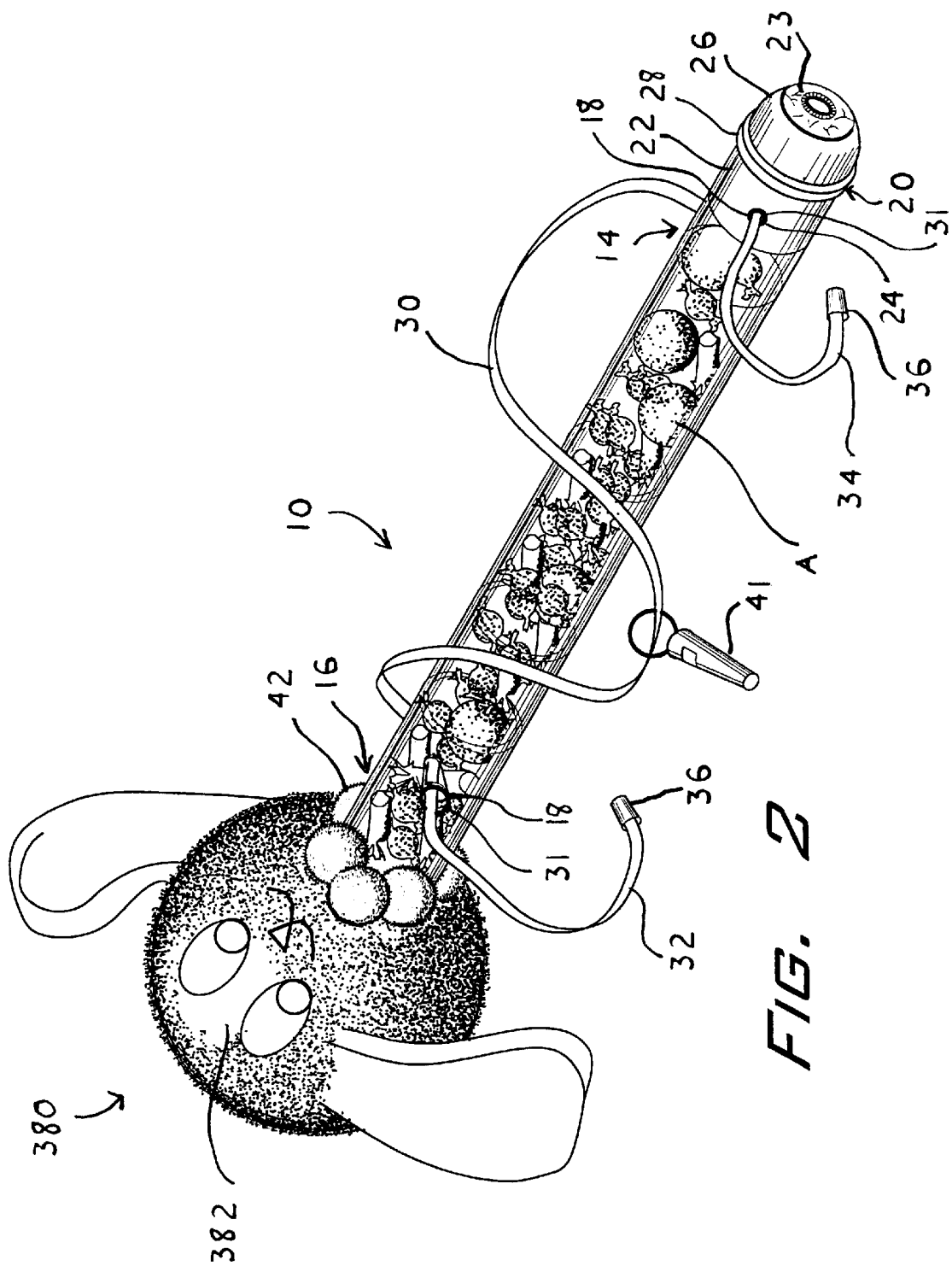
FIG. 2 is an environmental, perspective view of a second embodiment of an eye novelty item according to the present invention wherein the fur ball is shaped like the head of an animal, e.g., an Easter rabbit.
Figure 3:
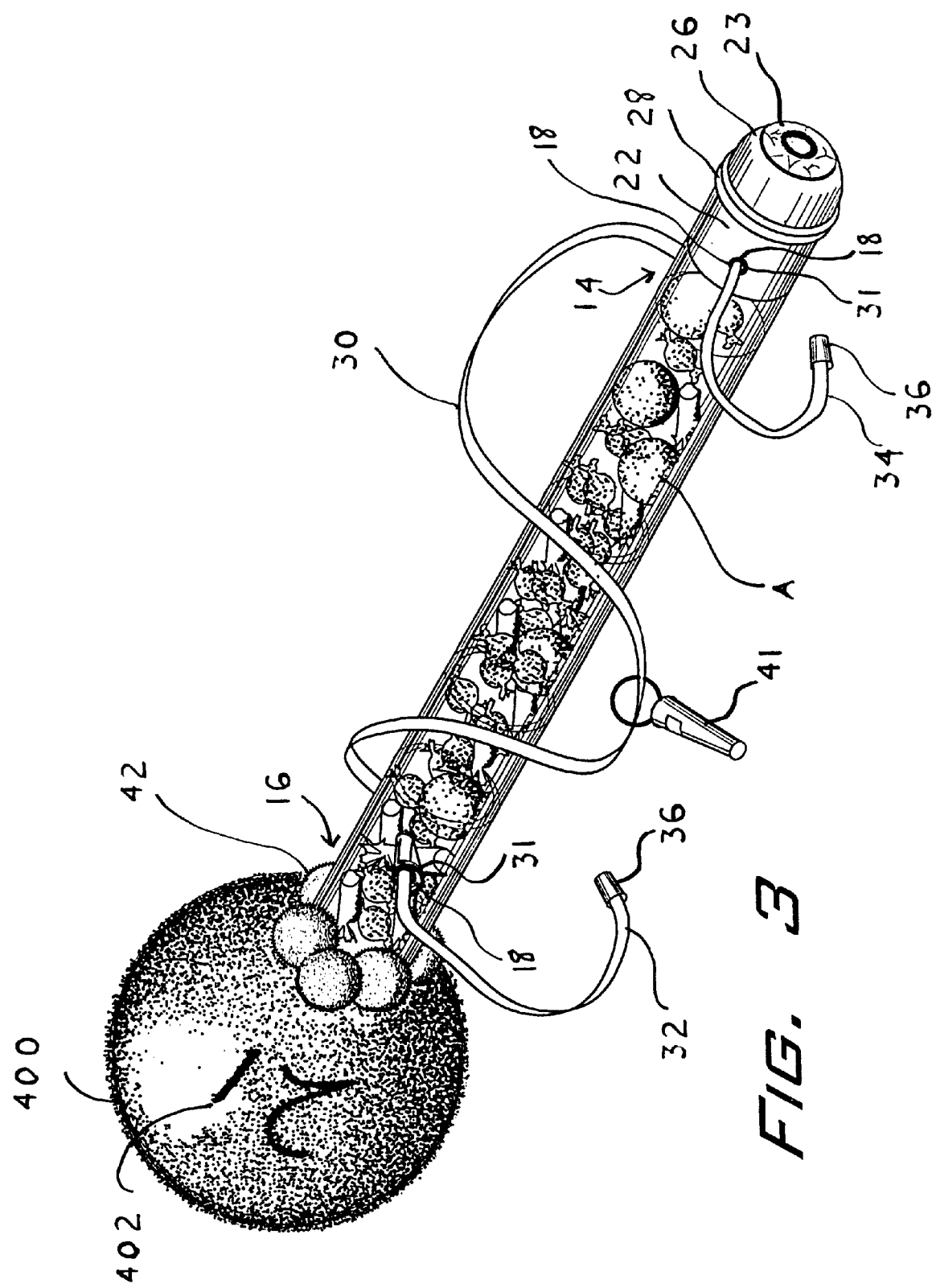
FIG. 3 is an environmental, perspective view of a third embodiment of an eye novelty item wherein the fur ball has numerals to represent individual players' jerseys.

As shown in a second embodiment, FIG. 2, head piece 380 further comprises a face 382 of a human or animal. As shown in a third embodiment, FIG. 3, printed onto, or weaved or dyed into sheet 400, may be numerals 402 to represent the numbers on the sports jersey of a favorite player.

In each embodiment, the container 12 may be filled with candy A which may be dispensed through dispenser cap 20.

It is to be understood that the present invention is not limited to the sole embodiments described above, but encompasses any and all embodiments within the scope of the following claims.

I claim:

1. A candy dispensing novelty device, comprising:

an elongated, hollow, transparent, tubular container having a first end, a second end, and a plurality of transverse holes formed therethrough proximate each said end;

a dispensing cap having an exterior surface, a cylindrical-shaped proximal end having at least two openings defined therein, a dome-shaped distal end, and a ring-shaped exterior lip dividing said proximal end from said distal end, said proximal end slidably insertable into said first end up to said lip such that said holes proximate said first end align with said openings, said cap having an eyeball-appearing figure disposed on said exterior surface of said distal end;

a shoulder cord having one end extending through two of said plurality of holes proximate said second end, and another end extending through the aligned holes and openings proximate said first end, each said end of said cord having fastened thereto a bead that is larger than said holes;

a spherical head piece affixed to said second end of said container;

a furry web attached to and encapsulating said head piece; and a pompom necklace encircling said container adjacent said head piece.

2. The device according to claim 1, further comprising a plastic whistle threaded onto said shoulder cord.

3. The device according to claim 1, wherein said head piece further comprises the face of a human or animal.

4. The device according to claim 1, wherein said head piece further comprises a numeral to represent a sports jersey number.

5. The device according to claim 1, wherein said eyeball-appearing figure is reflective, or fluorescent.

* * * * *